UNITED STATES PATENT OFFICE.

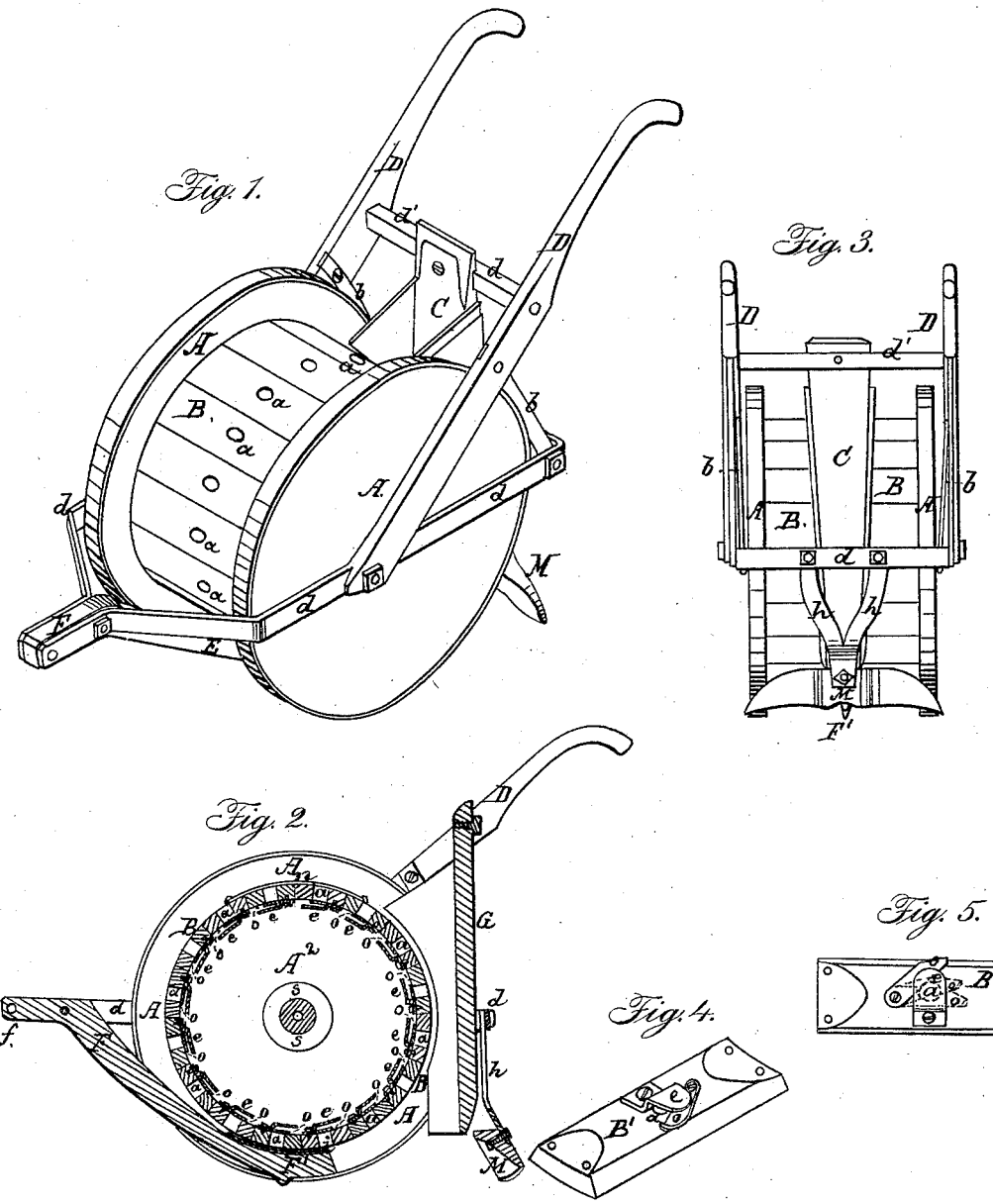

JOHN S. HUGGINS, OF TIMMONSVILLE, SOUTH CAROLINA.

IMPROVEMENT IN SEED-PLANTERS.

Specification forming part of Letters Patent No. 27,291, dated February 28, 1860.

*To all whom it may concern:*

Be it known that I, J. S. HUGGINS, of Timmonsville, county of Darlington, in the State of South Carolina, have invented certain Improvements in Machines for Sowing Seed and Fertilizers; and I do hereby declare that the following is a full and exact description thereof, reference being had to the accompanying drawings, and to the letters of reference marked thereon.

The nature of my invention consists in certain improvements in seeding-machines, as hereinafter fully described.

To enable those skilled to make and use my invention, I will proceed to describe its construction and operation, referring by letters to the accompanying drawings, forming part of this specification, and in which—

Figure 1 represents a perspective view of my improved seeding-machine. Fig. 2 represents a vertical longitudinal section through the center of the same. Fig. 3 represents a back view of the same. Fig. 4 represents a perspective of section of the drum or seed-reservoir inverted. Fig. 5 represents a plane internal of one of the sections of the drum.

Similar letters indicate the same parts in the different views.

A A are the heads of the seed-drum, which constitute also the wheels of the apparatus.

B is the drum, which contains the seed to be sown. Said drum is formed of a series of staves or sections, B', (see Figs. 4 and 5,) in each one of which, about at its center, is a round hole, $a$, (see Figs. 1 and 2,) through which the seed is discharged, and said drum B, with its wheel-heads A, is hung at its axis S in a suitable frame, $d$. This frame $d$ is illustrated as being formed of a single bar of metal extending around the seed-drum and embracing between its two ends (at the front of the machine,) the curved beam F, the lower end, F', of which is made to constitute the drill or furrow former to the frame $d$. On either side of the drum, and immediately in advance of the axle, are secured the forward ends of the operator's handles D, which extend sufficiently far backward and are sufficiently inclined upward to insure an easy and perfect control of the apparatus. Said handles or arms D are braced vertically from the frame $d$ by supporting brace-bars $b$, and are braced together by a cross-bar, $d'$.

M is the coverer, which is secured to the lower part of a bifurcated holder-arm, $h$, which is secured at the upper ends of its legs to the rear side of frame $d$ by screw-bolts C, the retaining or guide tenegle, which is firmly secured to the cross-piece $d'$, and passes down against the inner surface of the rear side of the frame $d$, to which also it may be secured. The arm F curves concentrically under the drum B, and is provided on its upper surface of its lower end with a plate-piece, $i$, closely over which runs the drum B.

A are the discharge holes or exits, $e$ their shields, and $o$ their adjustable stops or "cut-offs." At the point $f$ may be attached the ordinary drill, like that of a plow, to which the team for drawing the apparatus is coupled. Two of the sections B' may be arranged with hinges to open like doors, to allow of the introduction of the material to be sown, and are fastened down in place by wire retaining-hooks $n$.

The operation of my improved apparatus will be understood (after the foregoing description of its construction) by the following explanation: The drum is charged with seed through the doors or opening sections, (which are then locked with the bars $n$,) and the team being attached to the forward end of frame $d$, and the handles D being grasped by the operator, the machine is to be drawn over the field. The share F' forms the furrow, into which the seed is continuously discharged through the exits $a$ as the drum B rotates on its axis $s$. In order to prevent the escape of the seed from the holes $a$ until after said holes arrive at the rear side of the share F', which forms the furrow, a shield, $c$, is arranged over each hole $a$, which shield consists of a bent piece of sheet metal arranged, as seen in the drawings, (at Figs. 2, 4, and 5,) in such manner as that the seed will not feed to the holes until the said holes are about passing under the center of the drum. In the rapid rotation of the seed-drum the seed will be thrown somewhat backward, and to prevent the scattering of the seed thus thrown a retainer or guide-spout, C, is arranged in the rear of the rotating drum, which spout catches and guides down to the furrow, the coverer M passes over them, and, scraping from either side of the furrow the dirt, covers them. The "cut-off" plates $o$ are adjustable, as illustrated at Fig. 5, so that by moving them on their pivots the capacity of the holes *a* may be diminished and increased or entirely cut off, (stopped off,) so that by partially closing up the holes, or some of them, the machine may be made to sow the seed more sparingly, or may be adapted perfectly to different kinds of seed or even to fertilizers, while by entirely closing a given portion of the holes *a* (equidistantly) the seed will be sown at intervals or in hills.

It will be seen from the foregoing description of my machine, together with the drawings, that it can be so adjusted as to sow any material or seed, and also that it can be adjusted to sow a continuous line or drill or in hills, as may be desired; and it will be observed that the whole construction of the apparatus is simple and durable, and that by the employment of the shields, as described, the seed is not allowed to make its escape until the exits have arrived at the proper place.

Having described the construction and operation of my improved seed (or fertilizer) sowing machine, what I claim, then, as new, and desire to secure by Letters Patent, is—

1. The combination, with a series of discharge-exits, of the series of shield-plates *e*, adjustable cut-offs *o*, and guiding-spout C, the whole constructed and operating as specified, for the purpose set forth.

2. The curved furrow-former F' and shield-plate *i*, in combination with the rotating seed-drum B, guiding-spout C, and shields *e*, the whole constructed and operating as specified, for the purpose set forth.

3. The arrangement of the drum B, with its wheel-heads A, with the continuous frame-piece *d*, handles D, and furrow-former F F', the whole constructed and operating as specified, for the purposes set forth.

In testimony whereof I have hereunto set my hand and affixed my seal this 8th day of December, 1859.

JOHN S. HUGGINS. [L. S.]

Witnesses:
  G. L. NETTLES,
  J. G. HALLFORD.